(12) United States Patent
Hara

(10) Patent No.: US 9,834,172 B2
(45) Date of Patent: Dec. 5, 2017

(54) VEHICULAR PEDESTRIAN PROTECTING AIRBAG DEVICE

(71) Applicant: TOYOTA JIDOSHA KABUSHIKI KAISHA, Toyota-shi, Aichi (JP)

(72) Inventor: Yasuhiro Hara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/103,506

(22) PCT Filed: Dec. 22, 2014

(86) PCT No.: PCT/JP2014/083999
§ 371 (c)(1),
(2) Date: Jun. 10, 2016

(87) PCT Pub. No.: WO2015/098890
PCT Pub. Date: Jul. 2, 2015

(65) Prior Publication Data
US 2016/0311395 A1    Oct. 27, 2016

(30) Foreign Application Priority Data

Dec. 24, 2013  (JP) ................. 2013-266060

(51) Int. Cl.
*B60R 21/38*   (2011.01)
*B60R 21/36*   (2011.01)
*B60R 21/34*   (2011.01)

(52) U.S. Cl.
CPC .............. *B60R 21/36* (2013.01); *B60R 21/34* (2013.01); *B60R 21/38* (2013.01)

(58) Field of Classification Search
CPC .......... B60R 21/34; B60R 21/36; B60R 21/38; B60R 2021/343
See application file for complete search history.

(56) References Cited

U.S. PATENT DOCUMENTS

2002/0140211 A1   10/2002   Takahara
2003/0159875 A1*  8/2003   Sato ..................... B62D 25/081
                                                  180/274

(Continued)

FOREIGN PATENT DOCUMENTS

JP    2002283945 A   10/2002
JP    2003-095053 A   4/2003

(Continued)

*Primary Examiner* — Barry Gooden, Jr.
(74) *Attorney, Agent, or Firm* — Oliff PLC

(57) ABSTRACT

A vehicular pedestrian protecting airbag device that is capable of suppressing increases in weight and cost accompanying reinforcement measures, and capable of maintaining good pedestrian protection performance of an upper face of a hood. An automobile pedestrian protecting airbag device is installed at a vehicle lower side of a rear end section of a hood at a vehicle rear side of a protruded portion. A pedestrian protecting airbag and an inflator are installed inside a module case. The inflator is attached to a bottom wall of the protruded portion by inflator attachment brackets each formed with an excess length portion at an intermediate portion. Accordingly, when the inflators attempt to move toward the vehicle front side due to deployment reaction force of the pedestrian protecting airbag, the excess length portions are compressed and deform to enable the deployment reaction force to escape.

16 Claims, 14 Drawing Sheets

(56) References Cited

U.S. PATENT DOCUMENTS

| | | | |
|---|---|---|---|
| 2006/0175115 A1* | 8/2006 | Howard | B60R 21/36 |
| | | | 180/274 |
| 2007/0023222 A1 | 2/2007 | Okamoto et al. | |
| 2007/0262569 A1* | 11/2007 | Kikuchi | B60R 21/215 |
| | | | 280/728.3 |
| 2010/0230944 A1* | 9/2010 | Narita | B60R 21/36 |
| | | | 280/741 |
| 2014/0291054 A1* | 10/2014 | Tanaka | B60R 21/36 |
| | | | 180/274 |
| 2014/0291055 A1* | 10/2014 | Tanaka | B60R 21/237 |
| | | | 180/274 |
| 2015/0090516 A1* | 4/2015 | Kitte | B60R 21/36 |
| | | | 180/274 |
| 2016/0200286 A1* | 7/2016 | Farrington | B60R 21/38 |
| | | | 180/274 |
| 2016/0229373 A1* | 8/2016 | Higashimachi | B60R 21/36 |
| 2016/0311395 A1* | 10/2016 | Hara | B60R 21/38 |
| 2016/0375856 A1* | 12/2016 | Osanai | B60R 21/36 |
| | | | 180/274 |
| 2016/0375899 A1* | 12/2016 | Takenaka | B60T 7/22 |
| | | | 701/41 |

FOREIGN PATENT DOCUMENTS

| | | |
|---|---|---|
| JP | 2003-252145 A | 9/2003 |
| JP | 2004168111 A | 6/2004 |
| JP | 2005178587 A | 7/2005 |
| JP | 2007-055569 A | 3/2007 |
| JP | 2007-145046 A | 6/2007 |

* cited by examiner

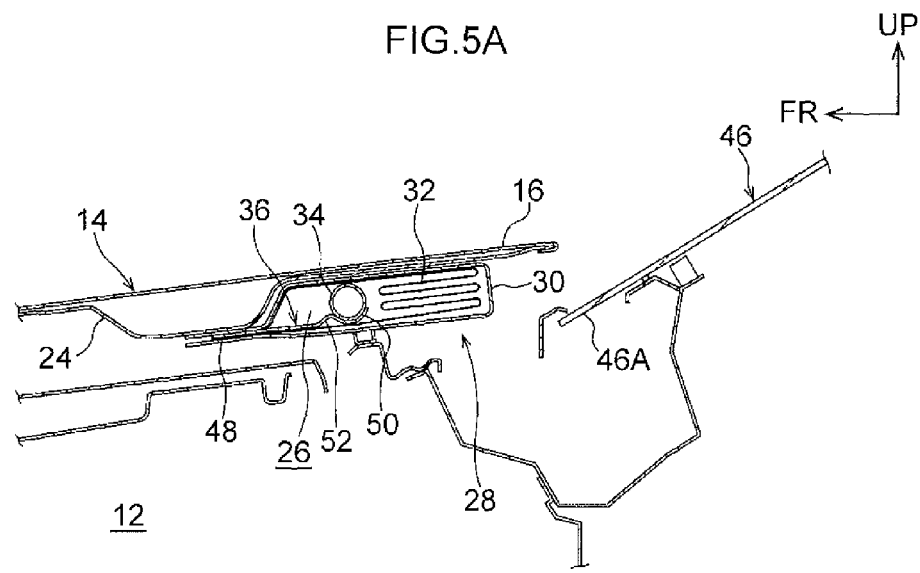
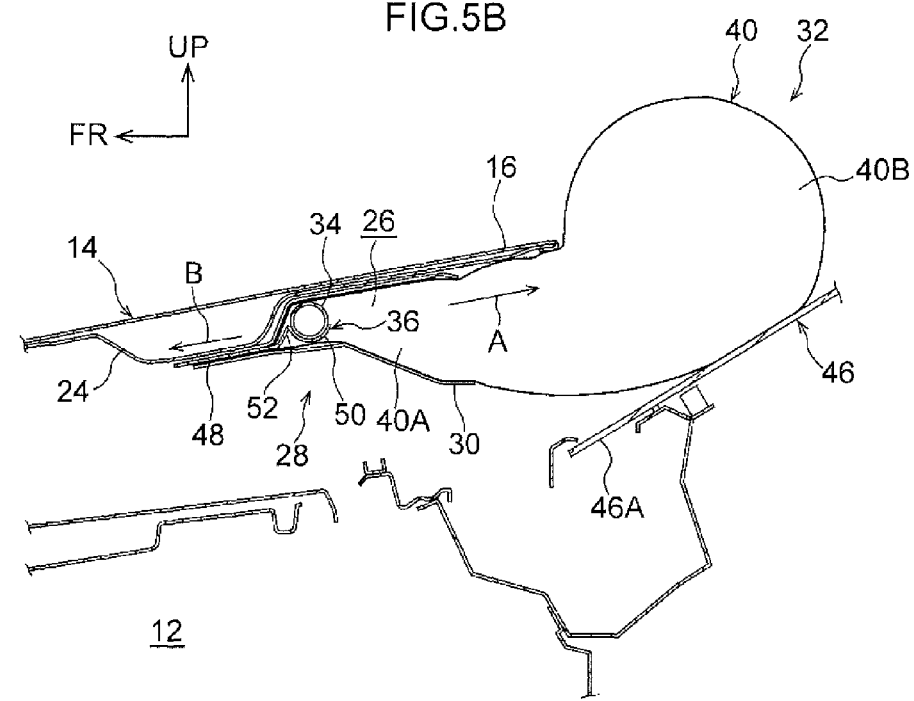

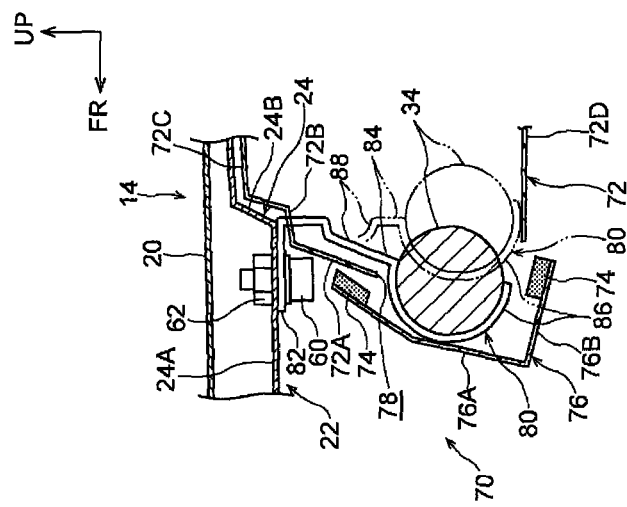
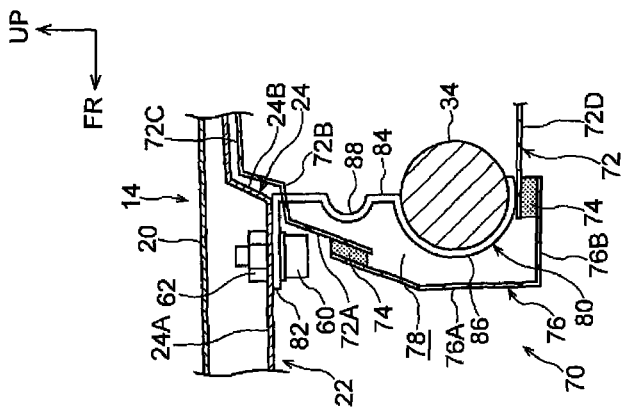

VEHICULAR PEDESTRIAN PROTECTING AIRBAG DEVICE

TECHNICAL FIELD

The present invention relates to a vehicular pedestrian protection airbag device.

BACKGROUND ART

Japanese Patent Application Laid-Open (JP-A) No. 2007-055569 describes an invention relating to a collision object protection device. In this collision object protection device, an airbag module is installed inside a cowl. In a collision with a pedestrian, a lid is opened and a hood airbag is inflated and deployed along a rear end of a hood and along left and right front pillars.

JP-A No. 2004-168111 describes an invention relating to a pedestrian protecting device. in this pedestrian protecting device, an airbag module is installed at a lower face side of a rear end section of a hood, and in a collision with a pedestrian, first, a rear end section of the hood is raised toward a vehicle upper side by a pop-up mechanism, and then, a lid is opened and a hood airbag is inflated and deployed through a gap between the rear end section of the hood and windshield glass along a rear end of the hood and along left and right front pillars.

SUMMARY OF INVENTION

Technical Problem

However, the related technology described in JP-A No. 2007-055569 has a configuration in which the airbag module is installed inside the cowl, resulting in a complex deployment direction of the hood airbag, and the possibility of unstable deployment behavior of the hood airbag. Moreover, it is necessary to reinforce and fix a module case to the cowl, thereby increasing weight and costs.

In the related technology described in JP-A No. 2004-168111, the hood airbag is inflated and deployed from between the rear end section of the popped-up hood and the windshield glass,
resulting in a more stable deployment direction of the hood airbag than in the related technology described in JP-A No. 2007-055569. However, it is necessary to reinforce the rear end section of the hood in order to withstand deployment reaction force of the hood airbag, and so the issue of increased weight and costs remains, similarly to in the related technology described in JP-A No. 2007-055569. Moreover, raising the rigidity and strength of the rear end section of the hood increases the rigidity and strength of an upper face of the hood, and it is conceivable that this could be detrimental to pedestrian protection performance.

In consideration of the above circumstances, an object of the present invention is to obtain a vehicular pedestrian protection airbag device capable of suppressing increases in weight and costs accompanying reinforcement measures, and also capable of maintaining good pedestrian protection performance of an upper face of a hood.

Solution to Problem

A vehicular pedestrian protection airbag device according to a first aspect includes: an inflator that is installed at a lower side of a rear end section of a hood capable of being raised toward a vehicle upper side at the rear end section, and that ejects gas on actuation; a pedestrian protection airbag that is stowed in a folded state at the lower side of the rear end section of the hood, and that inflates and deploys from between the rear end section of the hood and a windshield glass toward a vehicle upper face side and a vehicle rear side by being supplied with gas from the inflator; and an inflator attachment bracket configured including a first fixing portion fixed to a lower face side of the rear end section of the hood, a second fixing portion to which the inflator is fixed, and a deformation portion that is provided between the first fixing portion and the second fixing portion and that deforms by stretching or compressing so as to permit movement of the inflator toward an opposite direction from an inflation and deployment direction of the pedestrian protection airbag.

A vehicular pedestrian protection airbag device according to a second aspect is the first aspect, wherein the inflator attachment bracket is configured by a plate member, and the deformation portion is configured by an excess length portion formed in the plate member.

A vehicular pedestrian protection airbag device according to a third aspect is the first aspect, wherein the inflator attachment bracket is configured by a plate member, and the deformation portion is configured by a stretching portion provided at a periphery of a weakened portion due to forming the weakened portion at the plate member.

A vehicular pedestrian protection airbag device according to a fourth aspect is any one of the first aspect to the third aspect, further including a stopper that is provided on a movement direction side of the inflator, and that limits a movement amount of the inflator by impeding the inflator attachment bracket or the inflator.

A vehicular pedestrian protection airbag device according to a fifth aspect is the fourth aspect, wherein the stopper is configured by a separate component fixed to a hood inner panel configuring an inner side member of the hood.

A vehicular pedestrian protection airbag device according to a sixth aspect is the fourth aspect, wherein the stopper is configured by a vertical wall of a protruded portion, the protruded portion being integrally formed with a rear end section side of a hood inner panel configuring an inner side member of the hood and protruding toward the vehicle lower side.

A vehicular pedestrian protection airbag device according to a seventh aspect is any one of the first aspect to the sixth aspect, further including a module case that internally houses the pedestrian protection airbag, and an inflator case that is attached to a front wall portion of the module case through a sealing member and that is capable of detaching from the module case under input of contact load from the inflator.

A vehicular pedestrian protection airbag device according to an eighth aspect is any one of the first aspect to the sixth aspect, further including a module case that internally houses the inflator and the pedestrian protection airbag, wherein a planned rupture portion that ruptures under input of contact load from the inflator is set in the module case at a location facing the inflator.

A vehicular pedestrian protection airbag device according to a ninth aspect is any one of the first aspect to the eighth aspect, wherein: the inflator is formed in a straight column shape and is disposed with its length direction along a vehicle front-rear direction; and the inflator attachment bracket has the second fixing portion disposed at a central portion and the first fixing portion respectively provided at both sides of the second fixing portion, and has the deformation portion respectively provided between each of the first fixing portions and the second fixing portion.

A vehicular pedestrian protection airbag device according to a tenth aspect is any one of the first aspect to the ninth aspect, wherein: a protruded portion is formed at a vehicle rear side of a hood inner panel so as to protrude out toward the vehicle lower side and extend along a vehicle width direction, the protruded portion being provided at a position offset further toward a vehicle front side than the rear end section of the hood; and the inflator and the pedestrian protection airbag are disposed in a storage space formed at a hood inner panel at the vehicle rear side of the protruded portion.

A vehicular pedestrian protection airbag device according to an eleventh aspect is the tenth aspect, wherein the inflator is attached to a bottom wall of the protruded portion of the hood inner panel by employing the inflator attachment bracket.

A vehicular pedestrian protection airbag device according to a twelfth aspect is the eleventh aspect, wherein the inflator attachment bracket is manufactured by pressing a belt-shaped metal plate member that is long and thin in a vehicle front-rear direction.

A vehicular pedestrian protection airbag device according to a thirteenth aspect is the eleventh aspect or the twelfth aspect, further including: a module case that is formed in an elongated substantially box shape with its length direction in the vehicle width direction, that stows the inflator and the pedestrian airbag, and that includes an upper side attachment wall and a lower side attachment wall, wherein the first fixing portion of the inflator attachment bracket is fastened to the bottom wall of the protruded portion of the hood inner panel together with the upper side attachment wall and the lower side attachment wall in a state of being clamped between the upper side attachment wall and the lower side attachment wall.

A vehicular pedestrian protection airbag device according to a fourteenth aspect is the thirteenth aspect, wherein: the module case further includes a front wall portion provided upright along a rear end wall of the protruded portion; and an excess length portion includes a first inclined portion facing the front wall portion along a vehicle front-rear direction, a second inclined portion facing the inflator along the vehicle front-rear direction, and an apex portion connecting the first inclined portion and the second inclined portion together.

A vehicular pedestrian protection airbag device according to a fifteenth aspect is the thirteenth aspect or the fourteenth aspect, wherein the second fixing portion is disposed at a position separated from a front wall portion of the module case by a specific distance toward the vehicle rear side.

A vehicular pedestrian protection airbag device according to a sixteenth aspect is any one of the eleventh aspect to the fifteenth aspect, wherein the second fixing portion is formed in a semicircular shape bulging toward the vehicle lower side, and the inflator is fixed to an upper face of the second fixing portion.

According to the first aspect, the inflator ejects gas on actuation of the inflator installed at the lower side of the rear end section of the hood. This gas is supplied inside the pedestrian protection airbag stowed in a folded state at the lower side of the rear end section of the hood. The pedestrian protection airbag accordingly inflates and deploys from between the rear end section of the hood and the windshield glass toward the vehicle upper face side and the vehicle rear side.

Note that in the present invention, the inflator is fixed to the second fixing portion of the inflator attachment bracket, of which the first fixing portion is fixed to the lower face side of the rear end section of the hood. Accordingly, when the inflator actuates and the pedestrian protection airbag inflates and deploys, deployment reaction force when this occurs acts on the inflator, and is also input to the rear end section side of the hood through the inflator attachment bracket.

In the present invention, the deformation portion is provided between the first fixing portion and the second fixing portion of the inflator attachment bracket, and when deployment reaction force toward the opposite direction to the inflation and deployment direction of the pedestrian protection airbag acts on the inflator, the deformation portion deforms and stretches (or is compressed). This thereby permits movement of the inflator toward the opposite direction to the deployment direction of the pedestrian protection airbag, enabling the deployment reaction force to escape (be diverted). The need to reinforce the rear end section of the hood, for example, in order to bear the deployment reaction force is eliminated as a result, or if reinforcement is made, the degree of reinforcement is lessened. Due to eliminating the need for reinforcement, or lessening the degree of reinforcement, of the rear end section of the hood, the rigidity of an upper face of the hood does not change, or there is only a very small increase in rigidity.

According to the second aspect, the inflator attachment bracket is configured by a plate member. The excess length portion formed in the plate member configures the deformation portion. This thereby enables a portion of the deployment reaction force of the pedestrian protection airbag to be absorbed by deformation of the excess length portion. This thereby enables a reduction in the deployment reaction force of the pedestrian protection airbag that is input to the rear end section side of the hood. Moreover, setting the deformation amount of the excess length portion enables a movement stroke of the inflator to be managed without increasing the number of components.

According to the third aspect, the inflator attachment bracket is configured by a plate member, and the deformation portion is configured by the stretching portion provided at the periphery of the weakened portion due to forming the weakened portion to the plate member. Stretching of the stretching portion enables a portion of the deployment reaction force of the pedestrian protection airbag to be absorbed. This thereby enables a reduction in the deployment reaction force of the pedestrian protection airbag that is input to the rear end section side of the hood. Moreover, there is no increase in the number of components, and the inflator attachment bracket does not increase in size.

According to the fourth aspect, when the inflator moves toward the opposite direction to the inflation and deployment direction of the pedestrian protection airbag under the deployment reaction force of the pedestrian protection airbag, the inflator attachment bracket or the inflator is impeded by the stopper. This limits the movement amount of the inflator. The pedestrian protection airbag is suppressed from being pulled in by the inflator as a result.

According to the fifth aspect, the stopper is configured as a separate component fixed to the hood inner panel, such that modifications to the hood itself are not required, and enabling the shape of the stopper to be set as desired.

According to the sixth aspect, since the stopper is configured by the vertical wall of the protruded portion that is integrally formed to the rear end side of the hood inner panel and protrudes toward the vehicle lower side, there is no increase in the number of components.

According to the seventh aspect, when the inflator moves in the opposite direction to the inflation and deployment direction of the pedestrian protection airbag due to the deployment reaction force of the pedestrian protection airbag, the inflator contacts the inflator case that houses the inflator. The inflator case accordingly detaches from the module case that houses the pedestrian protection airbag. This thereby enables the inflator to move further toward the opposite direction to the inflation and deployment direction of the pedestrian protection airbag. Moreover, since the inflator case is normally attached to the module case through the sealing member, there is no concern of water incursion.

According to the eighth aspect, when the inflator moves toward the opposite direction to the inflation and deployment direction of the pedestrian protection airbag under the deployment reaction force of the pedestrian protection airbag, the inflator contacts a wall of the module case that houses the inflator and the pedestrian protection airbag (a wall facing the inflator). A contact load is accordingly input from the inflator to the planned rupture portion set in the module case. The module case thereby ruptures along the planned rupture portion, enabling the inflator to move further in the opposite direction to the inflation and deployment direction of the pedestrian protection airbag. Moreover, the inflator case is not normally ruptured, and so there is no concern of water incursion. Since the module case does not have a divided structure, there is no need to set a separate sealing member.

The ninth aspect operates in the following manner. When a hood is cut away along the vehicle width direction, in general, the cross-section profile of the hood forms a protruding curved shape with a central section protruding out further toward the vehicle upper side than sections at both ends. Accordingly, if an inflator with a straight column shape is disposed with its length direction along the vehicle width direction, a dead space is formed between the inflator and the hood.

However, in the present invention, the inflator is disposed with its length direction along the vehicle front-rear direction, and the inflator attachment bracket has a corresponding structure in which the first fixing portion is respectively disposed at each side of the second fixing portion, thereby reducing dead space. Moreover, since respective deformation portions are formed between each first fixing portion and the second fixing portion, the burden on the respective deformation portions is reduced by half. This thereby enables the length of each deformation portion to be reduced by half for the same deployment reaction force, or enables twice the deployment reaction force to be accommodated if the length of the deformation portions is not reduced by half.

Advantageous Effects of Invention

As described above, the vehicular pedestrian protection airbag device according to the first aspect exhibits the excellent advantageous effect of suppressing increases in weight and costs accompanying reinforcement measures, and is also capable of maintaining good pedestrian protection performance of the upper face of the hood.

The vehicular pedestrian protection airbag device according to the second aspect exhibits the excellent advantageous effect of enabling deployment reaction force of the pedestrian protection airbag input to the rear end section of the hood to be suppressed without increasing weight and costs, and also enables the pedestrian protection airbag to be suppressed from being pulled in due to movement of the inflator.

The vehicular pedestrian protection airbag device according to the third aspect exhibits the excellent advantageous effect of enabling deployment reaction force of the pedestrian protection airbag input to the rear end section of the hood to be suppressed without increasing weight and costs, and does not increase the installation space required by the inflator attachment bracket.

The vehicular pedestrian protection airbag device according to the fourth aspect exhibits the excellent advantageous effect of enabling stable deployment behavior of the pedestrian protection airbag.

The vehicular pedestrian protection airbag device according to the fifth aspect exhibits the excellent advantageous effects of eliminating the need for costly design modifications, and enabling the movement amount of the inflator to be set as desired.

The vehicular pedestrian protection airbag device according to the sixth aspect exhibits the excellent advantageous effect of enabling an increase in costs accompanying an increase in assembly processes to be eliminated.

The vehicular pedestrian protection airbag device according to the seventh aspect exhibits the excellent advantageous effect of allowing sufficient movement of the inflator to allow deployment reaction force of the pedestrian protection airbag to escape even when movement space for the inflator cannot be secured inside the module case, and moreover, there is no concern of water incursion.

The vehicular pedestrian protection airbag device according to the eighth aspect exhibits the excellent advantageous effect of allowing sufficient movement of the inflator to allow deployment reaction force of the pedestrian protection airbag to escape even when movement space for the inflator cannot be secured inside the module case, and moreover, there is no concern of water incursion, and no increase in the number of components.

The vehicular pedestrian protection airbag device according to the ninth aspect exhibits the excellent advantageous effect of enabling greater space efficiency inside the hood, and also enables a larger deployment reaction force to be accommodated.

BRIEF DESCRIPTION OF DRAWINGS

FIG. 5A is a vertical cross-section illustrating a non-actuated state of an automobile pedestrian protection airbag device.

FIG. 5B is a vertical cross-section illustrating an actuated state of the automobile pedestrian protection airbag device illustrated in FIG. 5A.

FIG. 6A is a vertical cross-section illustrating a non-actuated state of an automobile pedestrian protection airbag device according to a second exemplary embodiment.

FIG. 6B is a vertical cross-section illustrating an actuated state of the automobile pedestrian protection airbag device illustrated in FIG. 6A.

DESCRIPTION OF EMBODIMENTS

First Exemplary Embodiment

Explanation follows regarding a first exemplary embodiment of a vehicular pedestrian protection airbag device according to the present invention, with reference to FIG. 1 to FIG. 5B. Note that in each of the drawings, the arrow FR indicates a vehicle front side, and the arrow UP indicates a vehicle upper side, as appropriate. The arrow IN indicates a vehicle width direction inner side.

Figure 3:
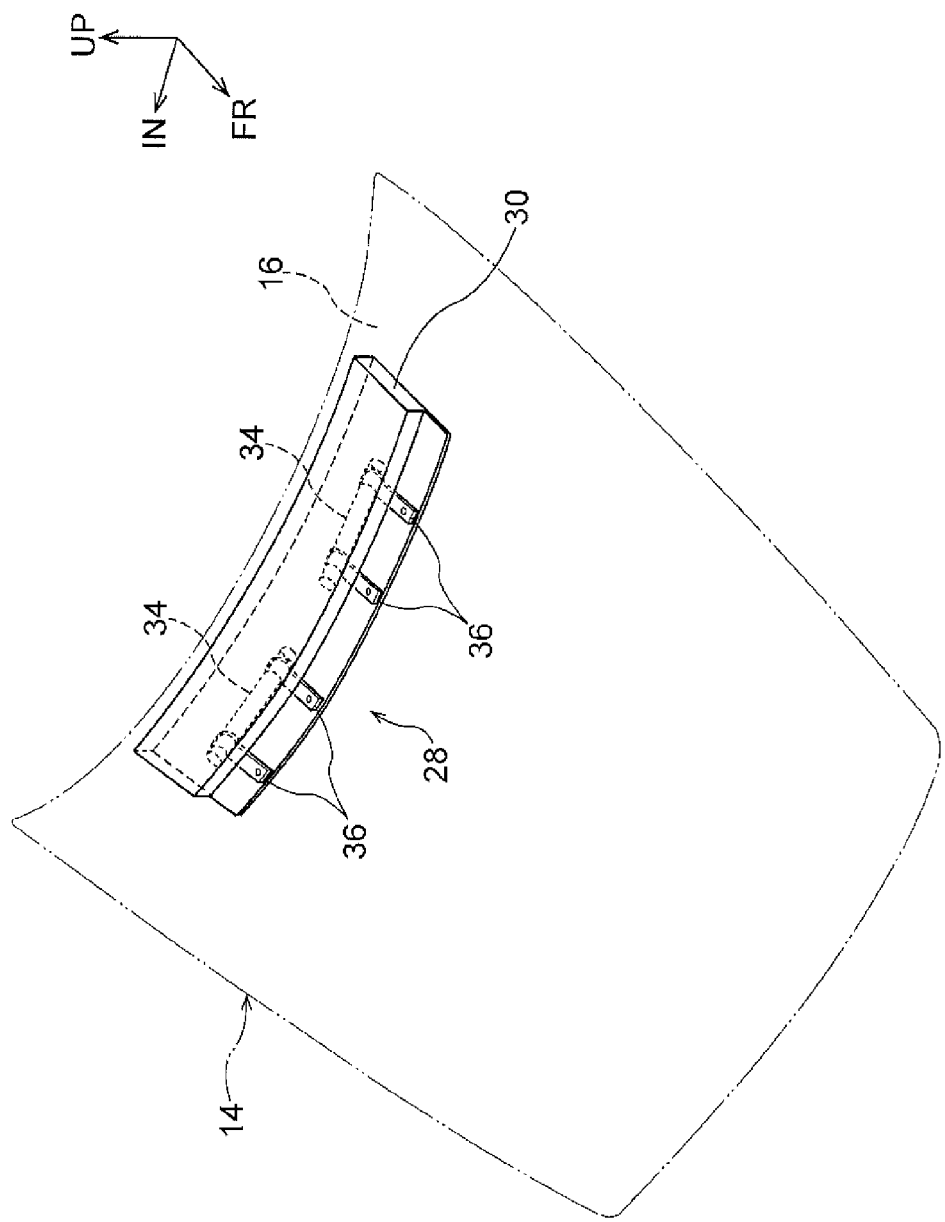
FIG. 3 is a perspective view illustrating an automobile pedestrian protection airbag device according to the first exemplary embodiment in a state installed to a hood.
Figure 4:
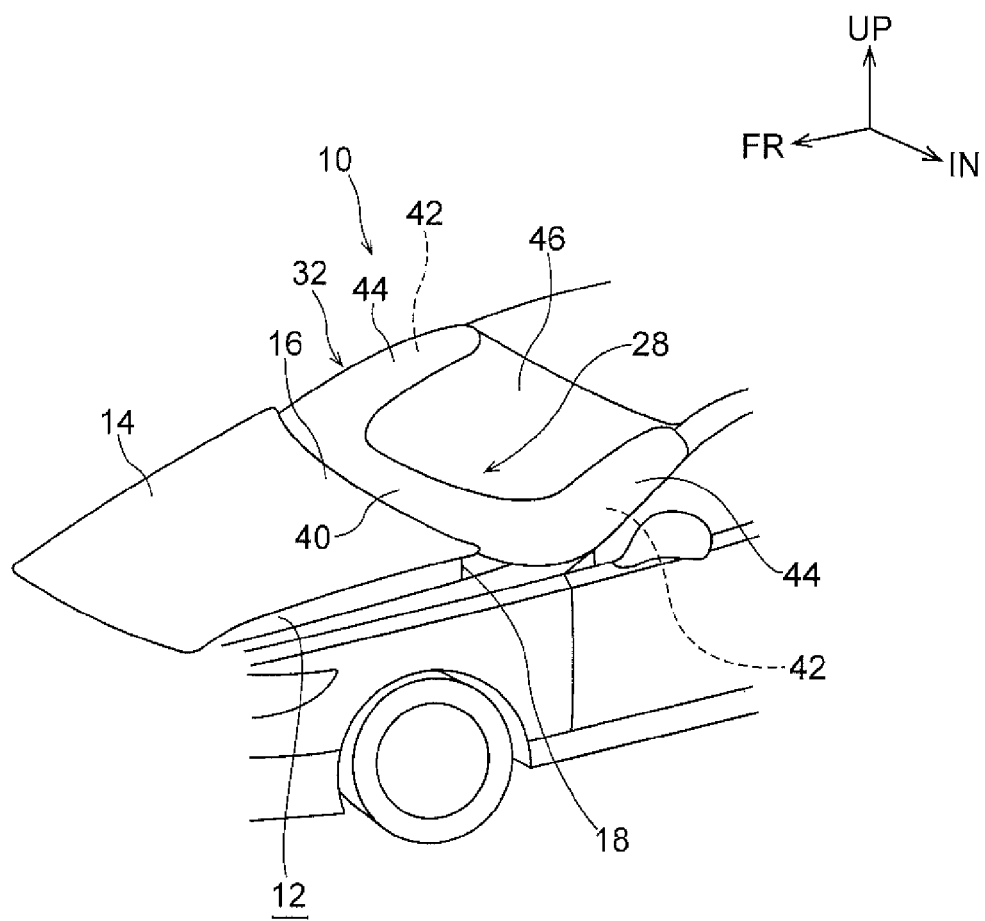
FIG. 4 is a perspective view illustrating a state in which an automobile pedestrian protection airbag device has actuated and a pedestrian protection airbag has inflated and deployed, in relation to an automobile.

As illustrated in FIG. 3 and FIG. 4, a hood 14 is provided at an upper face side of an engine room (power unit compartment) 12 of an automobile (vehicle) 10. A front end portion of the hood 14 is normally in a state locked by a hood lock, not illustrated in the drawings. Hood hinges, not illustrated in the drawings, are provided at both vehicle width direction sides of a rear end section 16 of the hood 14. The hood hinges are each configured including a hinge base fixed to a vehicle body, and a hinge arm fixed to the hood at one end portion and coupled to the hinge base through a pin at another end portion so as to be capable of swinging about the coupling point. A pop-up device 18 that raises the rear end section 16 of the hood 14 in a collision with a pedestrian is provided at both vehicle width direction outer sides of the rear end section of the hood 14. Note that FIG. 4 schematically illustrates the pop-up device 18 as a rod shaped member that rises up due to actuation of a gas generating section; however, the rear end section 16 of the hood 14 may be popped up using a link mechanism, and various configurations may be employed.

Figure 1:
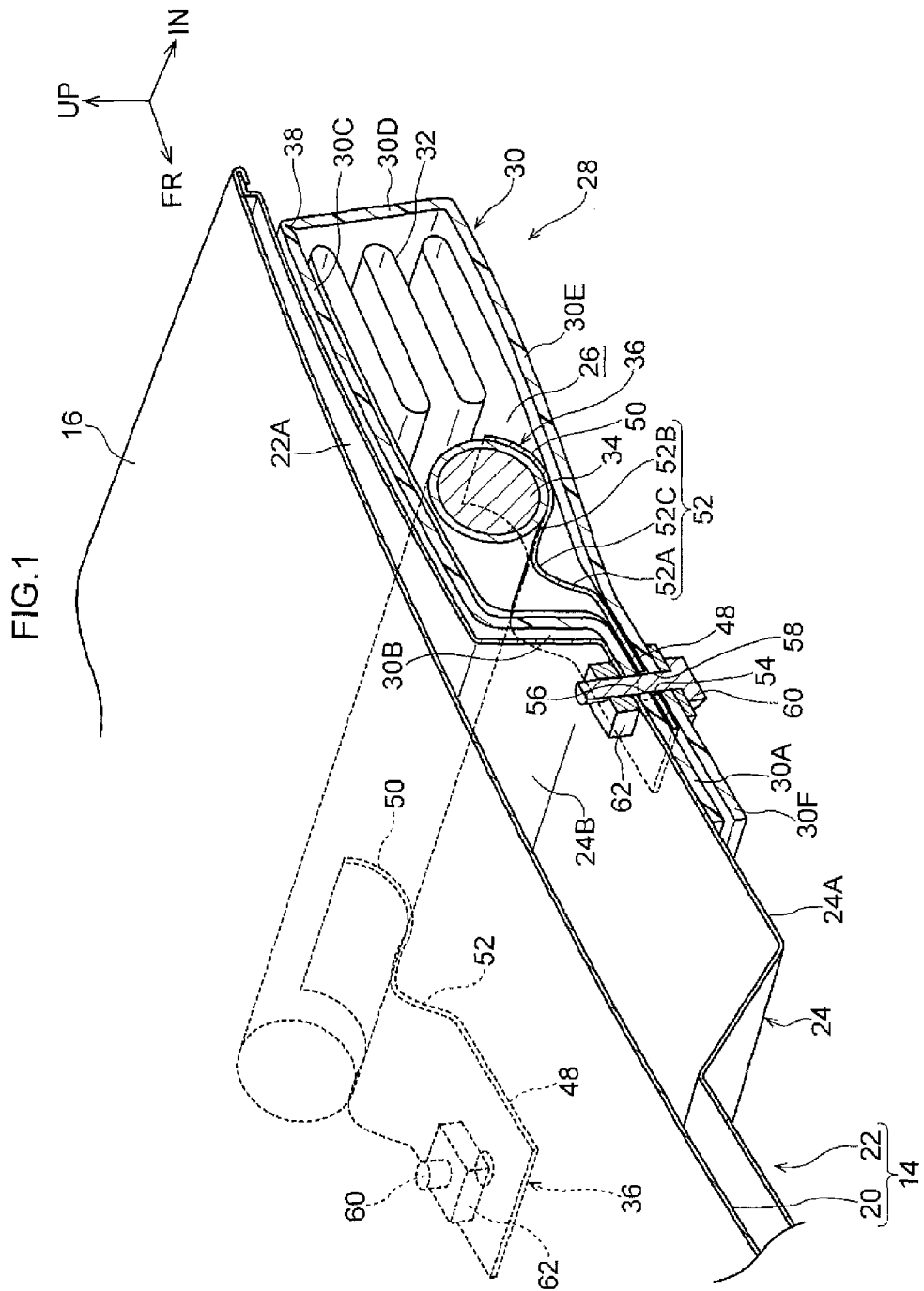
FIG. 1 is an enlarged perspective view of relevant portions, illustrating relevant portions of an automobile pedestrian protection airbag device according to a first exemplary embodiment cut away along a vehicle front-rear direction when in a non-actuated state.

As illustrated in FIG. 1 and FIG. 5A, the hood 14 is configured including a hood outer panel 20 disposed on the vehicle outside to form a design face of the hood 14, and a hood inner panel 22 disposed on the engine room 12 side to reinforce the hood outer panel 20. A protruded portion 24 protruding toward a vehicle lower side and extending along the vehicle width direction is formed at a vehicle rear side of the hood inner panel 22. The protruded portion 24 is not formed directly below the rear end section 16 of the hood 14, but formed at a position offset further toward the vehicle front side than the rear end section 16 of the hood 14. A housing space 26 is thereby formed in the hood inner panel 22 at the vehicle rear side of the protruded portion 24, and an automobile pedestrian protection airbag device 28, serving as a vehicular pedestrian protection airbag device according to the present exemplary embodiment, is installed in the housing space 26. Detailed explanation follows regarding configuration of the automobile pedestrian protection airbag device 28.

As illustrated in FIG. 1 and FIG. 3, the automobile pedestrian protection airbag device 28 is configured including a module case 30 formed in an elongated, substantially box shape with its length direction along the vehicle width direction, a pedestrian protection airbag (hood airbag) 32 stowed in a folded state inside the module case 30, inflators 34 that eject gas supplied into the pedestrian protection airbag 32 in a collision with a pedestrian, and inflator attachment brackets 36 for fixing the inflators 34 to the hood 14.

The module case 30 is configured including an upper side attachment wall 30A disposed in a state abutting a bottom wall 24A of the protruded portion 24 of the hood inner panel 22, a front wall portion 30B bent toward the vehicle upper side from a rear end portion of the upper side attachment wall 30A and projecting up along a rear end wall 24B of the protruded portion 24, an upper wall portion 30C that extends out from an upper end portion of the front wall portion 30B toward the vehicle rear side, a rear wall portion 30D bent toward the vehicle lower side from a rear end portion of the upper wall portion 30C, a lower wall portion 30E that extends from a lower end portion of the rear wall portion 30D toward the vehicle front side, a lower side attachment wall 30F continuing out toward the vehicle front side from the lower wall portion 30E and disposed at a lower side of the upper side attachment wall 30A, and left and right side wall portions, not illustrated in the drawings. The upper wall portion 30C is disposed following a general wall 22A of the hood inner panel 22. The rear wall portion 30D is disposed substantially parallel to the front wall portion 30B, and the lower wall portion 30E is disposed substantially parallel to the upper wall portion 30C.

A tear portion 38 thinned by forming a V-shaped groove is formed at a corner portion (a corner portion connecting between the upper wall portion 30C and the rear wall portion 30D) at a vehicle rear upper side at the inner side of the module case 30. The tear portion 38 has lower strength and rigidity than general portions of the respective walls.

As illustrated in FIG. 1, FIG. 4, and FIG. 5B, the pedestrian protection airbag (hood airbag) 32 is configured in a bag shape, for example by stitching together outer peripheral portions of two base cloths. In an inflated and deployed state, the pedestrian protection airbag 32 includes a bag main body section 40 extending in the vehicle width direction along the rear end section 16 of the hood 14, and a pair of bag side sections 44 that are in communication with the bag main body section 40 and cover front faces of a pair of left and right front pillars 42. The bag main body section 40 is configured by a bag base portion 40A that inflates in the vehicle width direction along a lower face of the rear end section 16 of the hood 14, and a bag circular tube portion 40B that inflates and deploys in a circular tube shape from between the rear end section 16 of the hood 14 and windshield glass 46, and covers a front face of a lower end portion 46A of the windshield glass 46. The pedestrian protection airbag 32 configured as described above is stowed inside the module case 30 folded into a concertina shape, and rolled up into a folded state.

As illustrated in FIG. 1 and FIG. 3, the pair of left and right inflators 34 are installed inside the pedestrian protection airbag 32 described above. Each of the inflators 34 is made of metal and is formed in a circular cylinder shape closed off at both axial direction end portions. A squib (ignition device), not illustrated in the drawings, is provided at an axial core portion at one axial direction end portion of each inflator 34. The inside of the inflator 34 is filled with a gas generation agent that generates a large amount of gas on combustion. Coolant to cool the generated high temperature gas, a filter to remove shrapnel occurring on combustion of the gas generation agent, and the like are housed inside the inflator 34. Note that the inflator 34 is an inflator of a type employing a gas generation agent; however, an inflator of a type containing high pressure gas may also be employed. A peripheral wall portion of the inflator 34 is formed with plural gas ejection holes.

The inflator 34 is connected to a controller (airbag ECU), not illustrated in the drawings, installed at a central section of a vehicle body floor. The controller is connected to a collision detection sensor (not illustrated in the drawings) or a collision prediction sensor (not illustrated in the drawings) installed in a front bumper, not illustrated in the drawings, disposed at a front end section of the automobile 10 with its length direction along the vehicle width direction. The collision detection sensor may, for example, employ a chamber method using an elongated pressure tube or pressure chamber disposed running along the front bumper at a front face side of front bumper reinforcement and pressure sensors, an optical fiber method, or the like. The collision prediction sensor may, for example, employ a pre-crash sensor installed at a central portion of the front bumper to predict a collision with a colliding body such as a pedestrian or the like using a millimeter wave radar and/or a stereo camera.

The inflators 34 configured as described above are attached to the bottom wall 24A of the protruded portion 24 of the hood inner panel 22 using the inflator attachment brackets 36. More specifically, the inflator attachment brackets 36 are manufactured by pressing belt shaped metal plates that are long and thin in the vehicle front-rear direction. Structurally, each of the inflator attachment brackets 36 includes main elements of a first fixing portion 48 that is fixed to a lower face side (namely the bottom wall 24A of the protruded portion 24) of the rear end section 16 of the hood 14, a second fixing portion 50 to which the inflator 34 is fixed, and an excess length portion 52 serving as a deformation portion provided between the first fixing portion 48 and the second fixing portion 50.

The first fixing portion 48 is formed in a rectangular flat plate shape, and is clamped between the upper side attachment wall 30A and the lower side attachment wall 30F of the pedestrian protection airbag 32. The first fixing portion 48 is formed with a bolt through hole 54. The upper side attachment wall 30A and the lower side attachment wall 30F are farmed with corresponding bolt through holes 56, 58 coaxially to the bolt through hole 54 of the first fixing portion 48. An attachment bolt 60 is inserted through the bolt through holes 56, 54, 58 in sequence from the vehicle lower side and screwed together with a weld nut 62 provided at an upper face of the bottom wall 24A of the protruded portion 24, thereby fastening the inflator attachment bracket 36 to the bottom wall 24A of the protruded portion 24 together with the module case 30, The second fixing portion 50 is formed in a substantially semicircular curved face shape. The second fixing portion 50 is disposed so as to bulge toward the vehicle lower side, and the inflator 34 is fixed to an upper face of the second fixing portion 50 by a fixing, not illustrated in the drawings. In an assembled state of the automobile pedestrian protection airbag device 28 to the lower face side of the rear end section 16 of the hood 14, the second fixing portion 50 of the inflator attachment bracket 36 is disposed at a position separated from the front wall portion 30B of the module case 30 by a specific distance toward the vehicle rear side.

The excess length portion 52 is formed in a hill shape as viewed from the side of the hood 14. The excess length portion 52 includes a first inclined portion 52A facing the front wall portion 30B in the vehicle front-rear direction, a second inclined portion 52B facing the inflator 34 in the vehicle front-rear direction, and an apex portion 52C connecting the first inclined portion 52A and the second inclined portion 52B together. In the present exemplary embodiment, the excess length portion 52 is formed in a hill shape; however there is no limitation thereto, and the excess length portion 52 may be formed in various shapes, such as a wave shape, a W-shape, a V-shape, a sideways S-shape, an M-shape, an N-shape, or the like.

A diffuser for regulating the flow of gas ejected from the gas ejection holes of the inflator 34 may be provided at the periphery of the inflator 34. As an example, the diffuser is formed in a circular cylinder shape, and is integrated to the inflator 34 by crimping an axial direction intermediate portion to an axial line side. In such a configuration, the inflator attachment brackets 36 may be fixed to an outer peripheral portion of the diffuser. In cases in which a diffuser is set at an outer peripheral portion of the inflator 34, the inflator 34 and the diffuser correspond to the "inflator" of the present invention.

Operation and Advantageous Effects of the Present Exemplary Embodiment

Next, explanation follows regarding operation and advantageous effects of the present exemplary embodiment.

As illustrated in FIG. 1 and FIG. 5A, the pop-up device 18 and the automobile pedestrian protection airbag device 28 are maintained in a non-actuated state in a state prior to a collision with a pedestrian. Namely, the rear end section 16 of the hood 14 is not popped up, and the pedestrian protection airbag 32 is stowed in a folded state inside the module case 30.

From this state, in a collision with a pedestrian, the collision detection sensor, not illustrated in the drawings, that is provided to the front bumper detects that a collision with a pedestrian has occurred. Note that similar also applies in cases in which a collision with a pedestrian has been predicted using a pre-crash sensor and/or a stereo camera.

Accordingly, as illustrated in FIG. 5B, first, the pop-up device 18 is actuated by the controller, not illustrated in the drawings, and the rear end section 16 of the hood 14 is raised (popped up) toward the vehicle upper side by a specific height.

Figure 2:
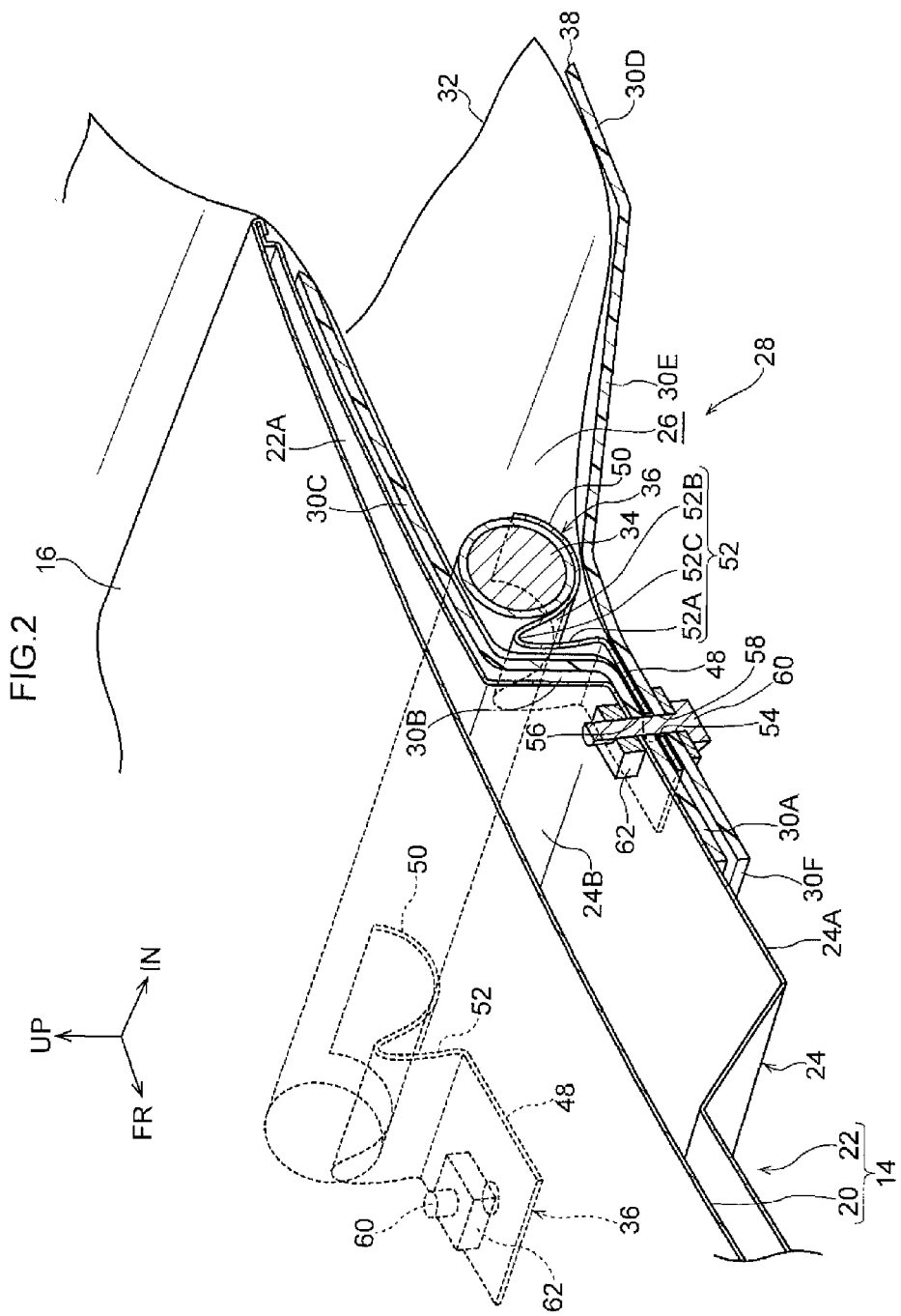
FIG. 2 is an enlarged perspective view of relevant portions corresponding to FIG. 1, illustrating an actuated state of the automobile pedestrian protection airbag device illustrated in FIG. 1.

When the raising amount of the rear end section 16 of the hood 14 has reached a specific amount, the inflators 34 of the automobile pedestrian protection airbag device 28 are actuated by the controller, not illustrated in the drawings. Gas is accordingly ejected through the gas ejection holes of the inflators 34, supplying the gas into the pedestrian protection airbag 32 that is in a folded state. The pedestrian protection airbag 32 thereby begins to inflate inside the module case 30, and tensile load applied to the tear portion 38 of the module case 30 increases. Then, when the tensile load applied to the tear portion 38 reaches a specific value, as illustrated in FIG. 2 and FIG. 5B, the tear portion 38 ruptures and the rear wall portion 30D and the lower wall portion 30E of the module case 30 open up toward the vehicle lower side. The pedestrian protection airbag 32 is accordingly inflated and deployed toward a vehicle upper face side and the vehicle rear side from between the rear end section 16 of the hood 14 and the windshield glass 46. In an inflated and deployed state of the pedestrian protection airbag 32, as illustrated in FIG. 4 and FIG. 5B, the bag circular tube portion 40B of the bag main body section 40 inflates and deploys in a circular tube shape in the vehicle width direction along the rear end section 16 of the hood 14, and the pair of left and right bag side sections 44 inflate and deploy so as to cover the front faces of the front pillars 42.

Note that in the present exemplary embodiment, the inflators 34 are fixed to the rear end section 16 side of the hood 14 by the inflator attachment brackets 36. Specifically, the first fixing portions 48 of the inflator attachment brackets 36 are fastened and fixed to the bottom wall 24A of the protruded portion 24 of the hood inner panel 22, and the inflators 34 are fixed to the second fixing portions 50. Accordingly, when the inflators 34 actuate and the pedestrian protection airbag 32 inflates and deploys, deployment reaction force acts on the inflators 34, and is then input to the rear end section 16 side of the hood 14 through the inflator attachment brackets 36.

Note that in the present exemplary embodiment, the excess length portions 52 are provided between the first fixing portions 48 and the second fixing portions 50 of the inflator attachment brackets 36. When deployment reaction force acts on the inflators 34 in the opposite direction (the arrow B direction in FIG. 5B) to the inflation and deployment direction of the pedestrian protection airbag 32 (the arrow A direction in FIG. 5B), the excess length portions 52 that are formed in hill shapes are compressed and undergo plastic deformation in a compression direction to achieve a specific energy absorption. The inflators 34 are thereby permitted to move in the opposite direction to the inflation and deployment direction of the pedestrian protection airbag 32, enabling the deployment reaction force to escape (be diverted). The need to reinforce the rear end section 16 of the hood 14, for example, in order to bear the deployment reaction force is eliminated as a result, or if reinforcement is made, the degree of reinforcement is lessened. Due to eliminating the need for reinforcement, or lessening the degree of reinforcement, of the rear end section 16 of the hood 14, the rigidity of an upper face of the hood 14 does not change, or there is only a very small increase in rigidity. As a result, the present exemplary embodiment enables increases in weight and cost accompanying reinforcement measures to be suppressed, and enables good pedestrian protection performance of the upper face of the hood 14 to be maintained.

In the present exemplary embodiment, the inflator attachment brackets 36 are configured from plate members, and deformation portions are configured by the excess length portions 52 formed in the plate members. Deformation of the excess length portions 52 thereby enables a portion of the deployment reaction force of the pedestrian protection airbag 32 to be absorbed. This thereby enables a reduction in the deployment reaction force from the pedestrian protection airbag 32 that is input into the rear end section 16 side of the hood 14. Moreover, setting the deformation amount of the excess length portions 52 enables a movement stroke of the inflators 34 to be managed without increasing the number of components. As a result, the present exemplary embodiment enables the deployment reaction force from the pedestrian protection airbag 32 that is input to the rear end section 16 of the hood 14 to be suppressed, and also enables the pedestrian protection airbag 32 to be suppressed from being pulled in due to movement of the inflators 34, without increasing weight and costs.

Second Exemplary Embodiment

Figure 7:
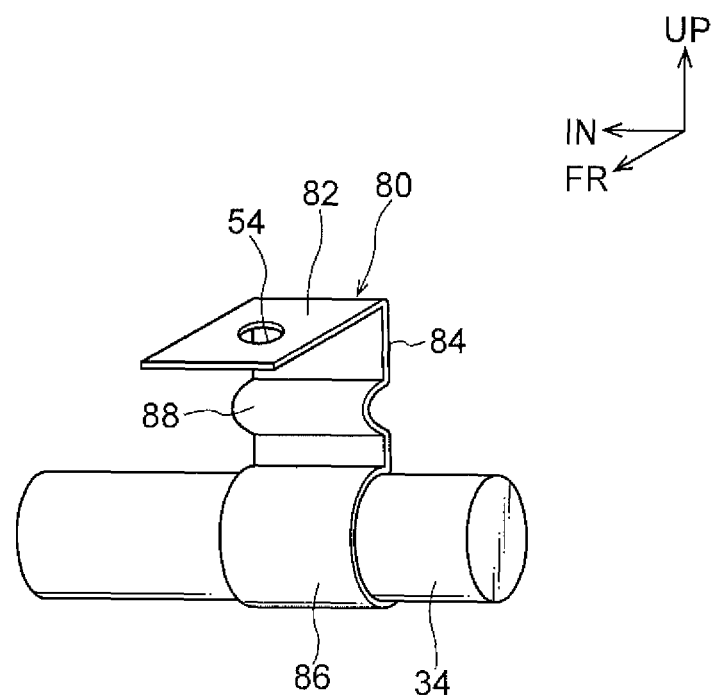
FIG. 7 is a perspective view illustrating an inflator attachment bracket illustrated in FIG. 6A.

Next, explanation follows regarding a second exemplary embodiment of a vehicular pedestrian protection airbag device according to the present invention, with reference to FIG. 6A, FIG. 6B, and FIG. 7. Note that configuration portions similar to in the first exemplary embodiment described above are allocated the same reference numerals, and explanation thereof is omitted.

As illustrated in FIG. 6A and FIG. 6B, an automobile pedestrian protection airbag device 70 serving as a vehicular pedestrian protection airbag device according to the second exemplary embodiment is similar to the automobile pedestrian protection airbag device 28 according to the first exemplary embodiment described above in the point that it is installed at the vehicle rear side of the protruded portion 24 of the hood 14. However, the automobile pedestrian protection airbag device 70 according to the second exemplary embodiment has a taller height along the vehicle up-down direction than the automobile pedestrian protection airbag device 28 according to the first exemplary embodiment (has a tall configuration).

The automobile pedestrian protection airbag device 70 includes a module case 72 that houses the pedestrian protection airbag 32, and an inflator case 76 that is attached to the module case 72 through a sealing member 74. In this sense, the module case may be understood as being divided into two. The module case 72 is configured by a vertical wall shaped front wall portion 72A disposed below a rear end of the bottom wall 24A of the protruded portion 24, a hook shaped step portion 72B formed at an upper end portion of the front wall portion 72A, an upper wall portion 72C bent from an upper end of the step portion 72B and extending out toward the vehicle rear side, a lower wall portion 72D extending out from a lower end of the front wall portion 72A toward the vehicle rear side, and a rear wall portion and left and right side wall portions, not illustrated in the drawings.

The inflator case 76 is formed in a substantially L-shape as viewed from the side, and is configured including a vertical wall portion 76A and a horizontal wall portion 76B. The front wall portion 72A and the lower wall portion 72D of the module case 72 are formed with a corresponding opening 78 straddling the front wall portion 72A and the lower wall portion 72D. The inflator case 76 is attached to the front wall portion 72A and the lower wall portion 72D of the module case 72 through the sealing member 74 so as to cover the opening 78 from the outer side of the module case 72. The sealing member 74 may employ two-sided adhesive tape, or an adhesive layer may be provided on both faces of a dry sealing member. A sealing member of a wet sealant that is coated and cured so as to function as a sealing member may also be employed.

As illustrated in FIG. 7, hanging inflator attachment brackets 80 are each configured including a flat plate shaped first fixing portion 82 disposed in a state abutting the lower face of the bottom wall 24A of the protruded portion 24, an intermediate portion 84 bent so as to project down from a vehicle rear side end portion of the first fixing portion 82, and a second fixing portion 86 formed from a lower end portion of the intermediate portion 84 in a semicircular shape as viewed from the side. As illustrated in FIG. 6A, the first fixing portion 82 of the inflator attachment bracket 80 is fastened and fixed to the bottom wall 24A of the protruded portion 24 by screwing an attachment bolt 60 from below the first fixing portion 82 into a weld nut 62 fixed to an upper face of the bottom wall 24A of the protruded portion 24. The intermediate portion 84 of the inflator attachment bracket 80 is inserted into the module case 72 through the step portion 72B of the module case 72. The inflator 34 is fixed to the second fixing portion 86 of the inflator attachment bracket 80 by a fixing, not illustrated in the drawings. A vehicle up-down direction intermediate portion of the intermediate portion 84 is formed with an excess length portion 88, serving as a circular arc shaped deformation portion opening toward the vehicle rear side, Operation and Advantageous Effects As illustrated in FIG. 6B, in the automobile pedestrian protection airbag device 70 configured as described above, when the inflators 34 actuate and the pedestrian protection airbag 32 inflates and deploys, the inflators 34 attempt to move toward the vehicle front side due to deployment reaction force when this occurs. Accordingly, the excess length portions 88 formed to the intermediate portions 84 of the inflator attachment brackets 80 are stretched, thereby achieving a specific energy absorption. Moreover, the second fixing portions 86 of the inflator attachment brackets 80 press the vertical wall portion 76A of the inflator case 76 toward the vehicle front side, thereby releasing an attached state of the inflator case 76 to the module case 72 through the sealing members 74, and detaching the inflator case 76. The inflators 34 can accordingly move outer side the module case 72 through the opening 78 formed to the front wall portion 72A and the lower wall portion 72D of the module case 72, and move further toward the vehicle front side.

Moreover, the inflator case 76 is normally attached to the module case 72 through the sealing member 74, and so there is no concern of water incursion into the module case 72 and the inflator case 76.

The present exemplary embodiment allows sufficient movement of the inflators 34 to enable deployment reaction force from the pedestrian protection airbag 32 to escape, even in cases in which movement space for the inflators 34 cannot be secured inside the module case 72. There is, moreover, no concern of water incursion.

Since the present exemplary embodiment builds on a configuration similar to that of the first exemplary embodiment described above, similar operation and advantageous effects are obtained to in the first exemplary embodiment, as described below, Namely, since deployment reaction force from the pedestrian protection airbag 32 can escape (be diverted), the need to reinforce the rear end section 16 of the hood 14, for example, in order to bear the deployment reaction force, is eliminated, or if reinforcement is made, the degree of reinforcement is lessened. Due to eliminating the need for reinforcement, or lessening the degree of reinforcement, of the rear end section 16 of the hood 14, the rigidity of the upper face of the hood 14 does not change, or there is only a very small increase in rigidity. As a result, the present exemplary embodiment enables increases in weight and cost accompanying reinforcement measures to be suppressed, and enables good pedestrian protection performance of the upper face of the hood 14 to be maintained. Note that these points similarly apply to the third exemplary embodiment onward, described below.

Moreover, in the present exemplary embodiment, the inflator attachment brackets 80 are configured by plate members, and configuring the deformation portions at the excess length portions 88 formed to the plate members enables a portion of the deployment reaction force of the pedestrian protection airbag 32 to be absorbed by deformation of the excess length portions 88. This thereby enables a reduction in the deployment reaction force of the pedestrian protection airbag 32 that is input to the rear end section 16 side of the hood 14. Moreover, setting the deformation amount of the excess length portions 88 enables a movement stroke of the inflators 34 to be managed without increasing the number of components. As a result, the present exemplary embodiment enables the deployment reaction force from the pedestrian protection airbag 32 that is input to the rear end section 16 of the hood 14 to be suppressed, and also enables the pedestrian protection airbag 32 to be suppressed from being pulled in due to movement of the inflators 34, without increasing weight and costs. Note that these points similarly apply to the third exemplary embodiment onward, described below.

Third Exemplary Embodiment

Figure 8A:
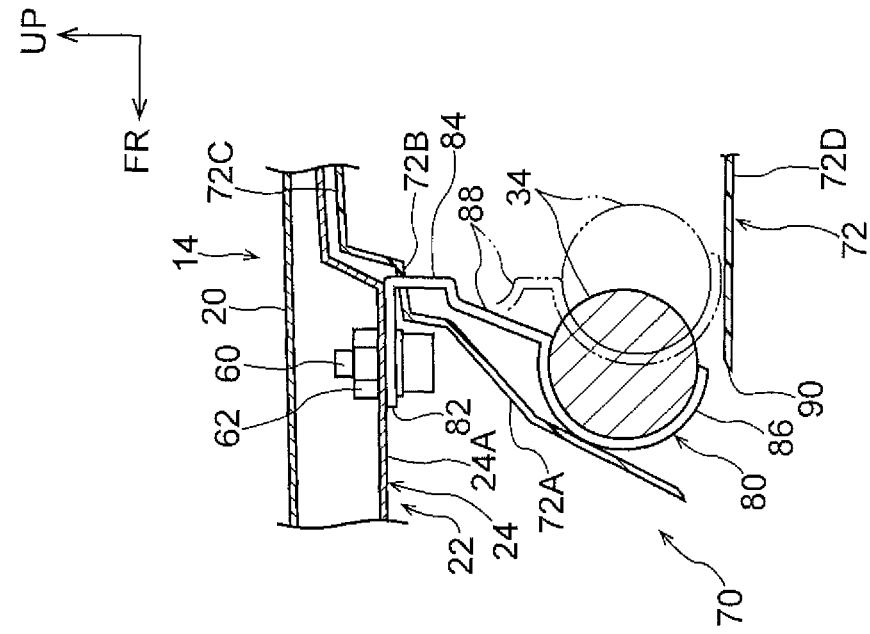
FIG. 8A is a vertical cross-section illustrating a non-actuated state of an automobile pedestrian protection airbag device according to a third exemplary embodiment.
Figure 8B:
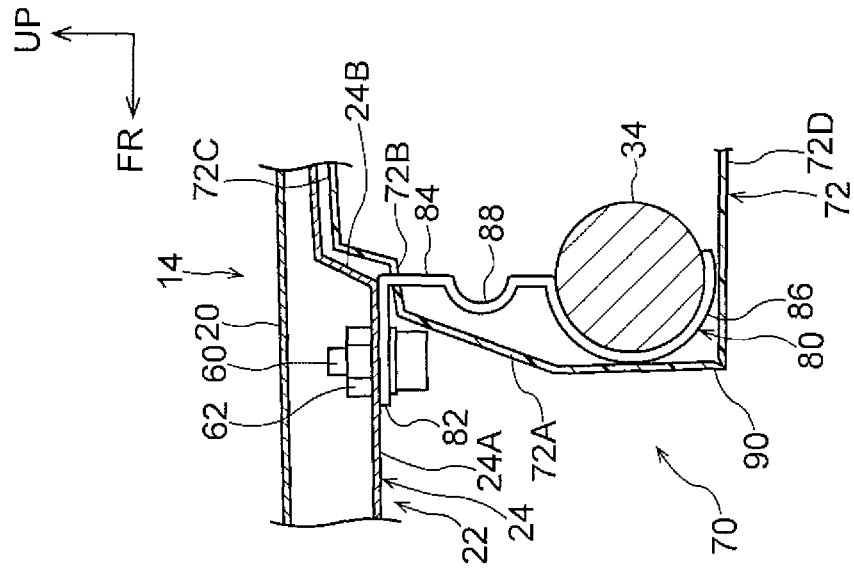
FIG. 8B is a vertical cross-section illustrating an actuated state of the automobile pedestrian protection airbag device illustrated in FIG. 8A.

Explanation follows regarding a third exemplary embodiment of a vehicular pedestrian protection airbag device according to the present invention, with reference to FIG. 8A and FIG. 8B. Note that configuration portions similar to in the first exemplary embodiment and so on described above are allocated the same reference numerals, and explanation thereof is omitted.

As illustrated in FIG. 8A and FIG. 8B, in the third exemplary embodiment, rather than providing the inflator case 76 of the second exemplary embodiment, a tear portion 90 is formed as a planned rupture portion that is thinned by forming a V groove on the case inside of the module case 72 at a connection portion between the front wall portion 72A and the lower wall portion 72D. Note that the tear portion 90 is formed to the front wall portion 72A in a range facing the inflators 34 along the vehicle front-rear direction, As viewed from the vehicle rear side of the module case 72, the tear portion 90 is formed in a U-shape in a region overlapping with the inflators 34. The tear portion 90 ruptures when applied with tensile load of a specific value or greater.

Operation and Advantageous Effects

In the configuration described above, when the inflators 34 move toward the vehicle front side due to deployment reaction force during inflation and deployment of the pedestrian protection airbag 32, the second fixing portions 86 of the inflator attachment brackets 80 press the front wall portion 72A of the module case 72 toward the vehicle front side. The tear portion 90 accordingly ruptures in a U-shape as viewed from the vehicle front side, and opens out toward the vehicle front side rotating about an upper edge side of the front wall portion 72A. This thereby enables the inflators 34 to move outer side the module case 72 and move further toward the vehicle front side.

Moreover, the tear portion 90 of the inflator case 76 is not normally ruptured, and so there is no concern of water incursion to the module case 72. Since the module case 72 does not have a divided structure, there is no need to set separate sealing members.

The present exemplary embodiment allows sufficient movement of the inflators 34 to enable deployment reaction force from the pedestrian protection airbag 32 to escape, even in cases in which movement space for the inflators 34 cannot be secured inside the module case 72. There is, moreover, no concern of water incursion, and no increase in the number of components.

Fourth Exemplary Embodiment

Figure 9A:
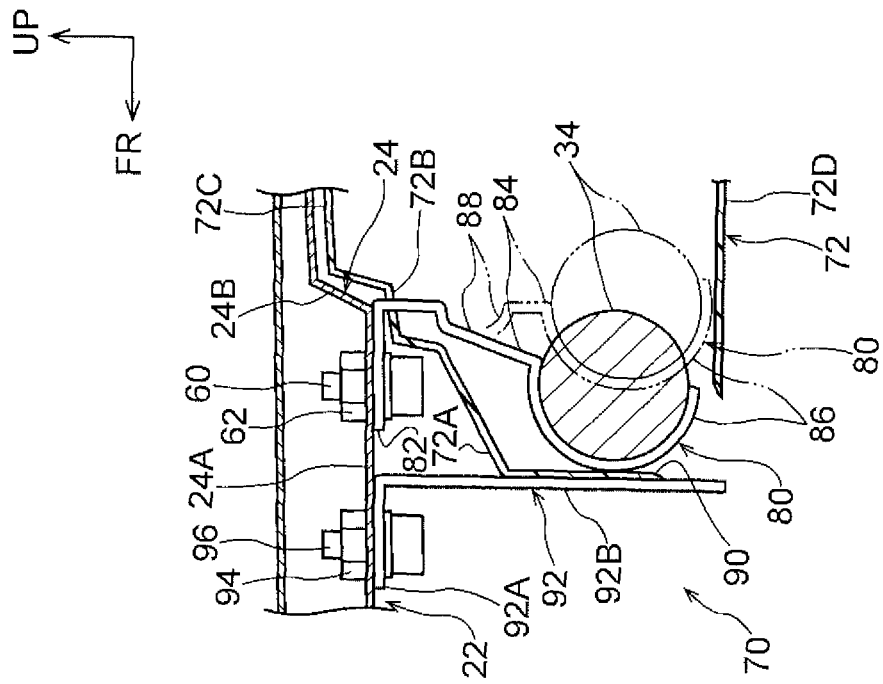
FIG. 9A is a vertical cross-section illustrating a non-actuated state of an automobile pedestrian protection airbag device according to a fourth exemplary embodiment.
Figure 9B:
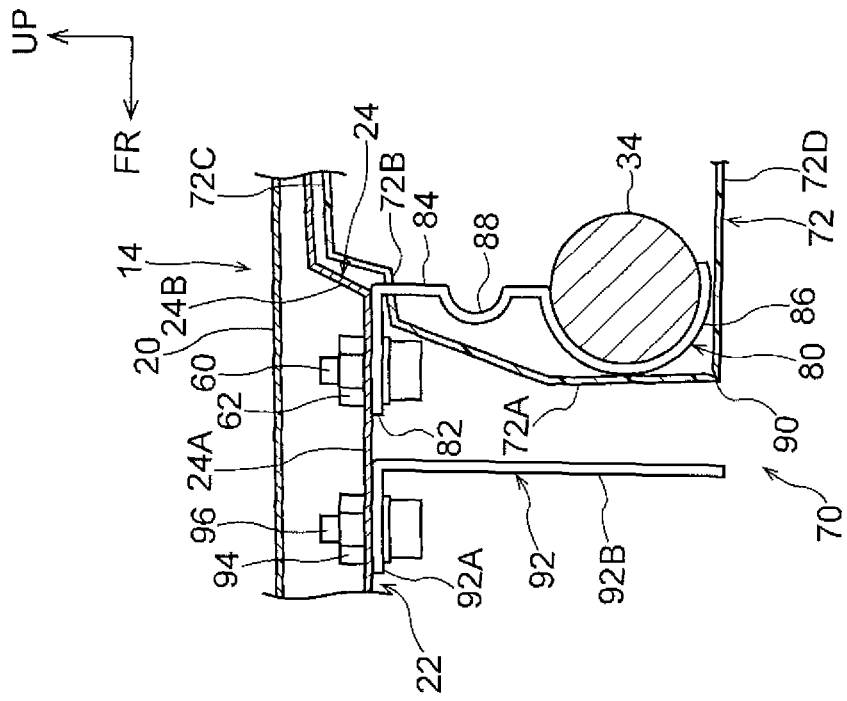
FIG. 9B is a vertical cross-section illustrating an actuated state of the automobile pedestrian protection airbag device illustrated in FIG. 9A.

Explanation follows regarding a fourth exemplary embodiment of a vehicular pedestrian protection airbag device according to the present invention, with reference to FIG. 9A and FIG. 9B. Note that configuration portions similar to in the first exemplary embodiment and so on described above are allocated the same reference numerals, and explanation thereof is omitted.

As illustrated in FIG. 9A and FIG. 9B, in the fourth exemplary embodiment, a stopper 92 is provided at the vehicle front side of the module case 72 of the third exemplary embodiment. More specifically, the stopper 92 configured by a separate component to the hood inner panel 22 is provided on the inflator 34 movement direction side (vehicle front side) of the bottom wall 24A of the protruded portion 24 of the hood inner panel 22. The stopper 92 is bent in an upside-down L-shape as viewed from the side, and includes an attachment portion 92A disposed at an upper portion, and a main body portion 92B bent so as to project downward from a rear end of the attachment portion 92A. The attachment portion 92A of the stopper 92 is fixed to the bottom wall 24A by a weld nut 94 and a fixing bolt 96. The main body portion 92B of the stopper 92 is disposed at a position at the vehicle front side of the front wall portion 72A of the module case 72, and impedes a movement path of the inflator 34. Note that in the present exemplary embodiment, the main body portion 92B of the stopper 92 contacts the second fixing portions 86 of the inflator attachment brackets 80 directly; however, the main body portion 92B of the stopper 92 may be disposed at a position contacted by the inflator 34.

Operation and Advantageous Effects

In the configuration described above, when the inflators 34 move toward the vehicle front side due to deployment reaction force during inflation and deployment of the pedestrian protection airbag 32, the second fixing portions 86 of the inflator attachment brackets 80 press the front wall portion 72A of the module case 72 toward the vehicle front side. The tear portion 90 accordingly ruptures in a U-shape as viewed from the vehicle front side, and opens out toward the vehicle front side, rotating about an upper edge side of the front wall portion 72A. This thereby enables the inflators 34 to move outer side the module case 72 and move further toward the vehicle front side.

In the present exemplary embodiment, due to providing the stopper 92 on the movement direction side of the inflators 34, when the inflators 34 move in opposite direction to the inflation and deployment direction of the pedestrian protection airbag 32 due to the deployment reaction force of the pedestrian protection airbag 32, the main body portion 92B of the stopper 92 impedes the second fixing portions 86 of the inflator attachment brackets 80. The movement amount of the inflators 34 is thereby limited. The pedestrian protection airbag 32 is suppressed from being pulled in by the inflators 34 as a result. The present exemplary embodiment thereby enables stable deployment behavior of the pedestrian protection airbag 32 as a result.

Moreover, in the present exemplary embodiment, the stopper 92 is configured from a separate component that is fixed to the bottom wall 24A of the protruded portion 24 of the hood inner panel 22. Accordingly, there is no need to modify the hood 14 itself, and the shape of the stopper 92 may be set as desired. Accordingly, the present exemplary embodiment does not require any costly design modifications, and enables the movement amount of the inflators 34 to be set as desired.

Fifth Exemplary Embodiment

Figure 10:
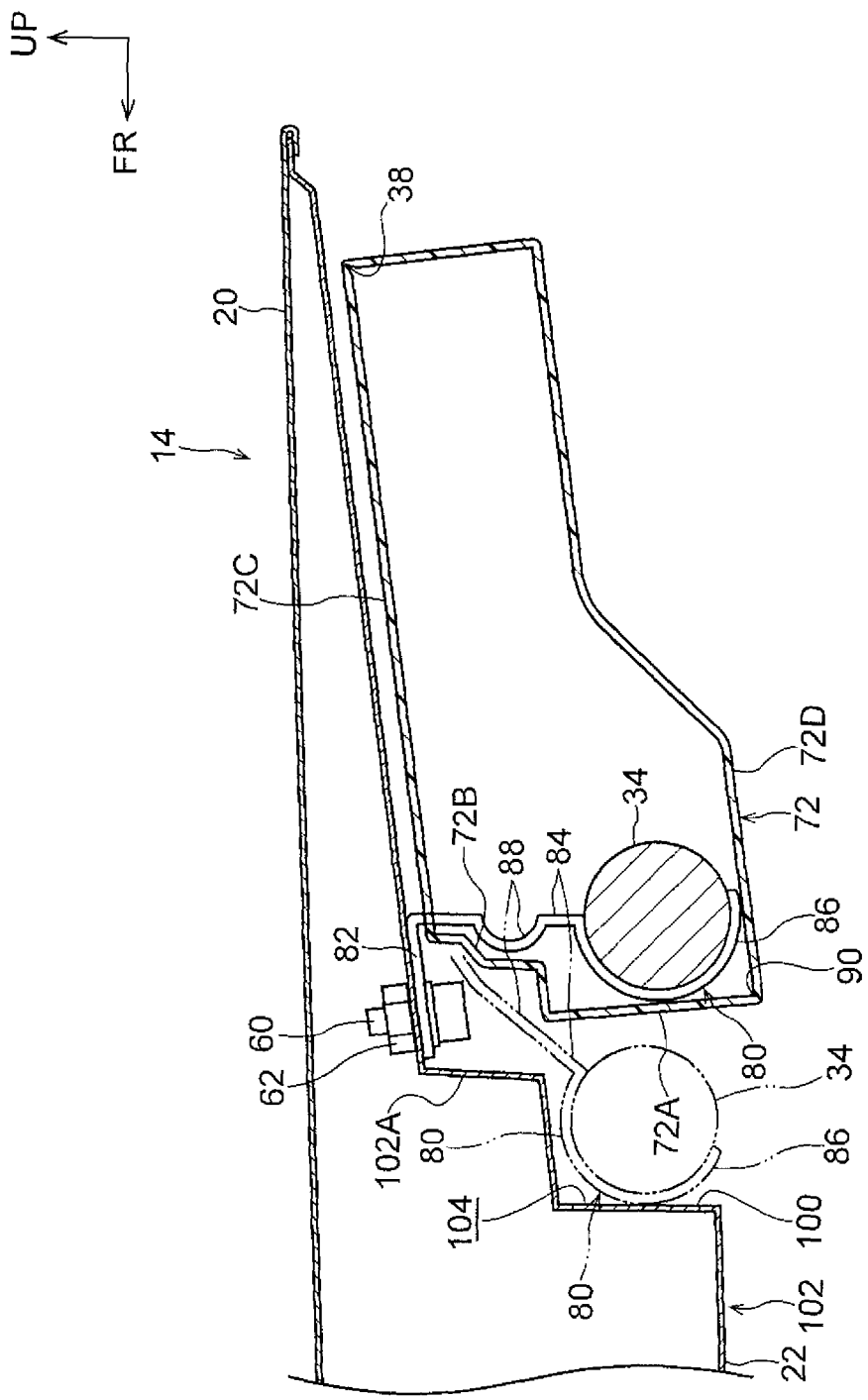
FIG. 10 is an enlarged vertical cross-section illustrating relevant portions of an automobile pedestrian protection airbag device according to a fifth exemplary embodiment.

Explanation follows regarding a fifth exemplary embodiment of a vehicular pedestrian protection airbag device according to the present invention, with reference to FIG. 10. Note that configuration portions similar to in the first exemplary embodiment and so on described above are allocated the same reference numerals, and explanation thereof is omitted.

As illustrated in FIG. 10, in the fifth exemplary embodiment, the hood inner panel 22 itself is employed to provide a stopper 100. More specifically, a protruded portion 102 that protrudes toward the vehicle lower side is integrally formed at a rear end side of the hood inner panel 22. A recess 104 into which the inflator 34 can enter is integrally formed at a lower portion of a rear end wall 102A of the protruded portion 102. The stopper 100 is configured by a vertical wall of the lower portion of the rear end wall 102A positioned within the recess 104.

Operation and Advantageous Effects

In the configuration described above, when the inflators 34 move toward the vehicle front side due to deployment reaction force during inflation and deployment of the pedestrian protection airbag 32, the second fixing portions 86 of the inflator attachment brackets 80 press the front wall portion 72A of the module case 72 toward the vehicle front side. The tear portion 90 accordingly ruptures in a U-shape as viewed from the vehicle front side, and opens out toward the vehicle front side, rotating about an upper edge side of the front wall portion 72A. This thereby enables the inflators 34 to move outer side the module case 72 and move further toward the vehicle front side.

In the present exemplary embodiment, due to providing the stopper 100 on the movement direction side of the inflators 34, when the inflators 34 move in the opposite direction to the inflation and deployment direction of the pedestrian protection airbag 32 due to the deployment reaction force of the pedestrian protection airbag 32, the inflators 34 enter the recess 104, and the stopper 100 impedes the second fixing portions 86 of the inflator attachment brackets 80. The movement amount of the inflators 34 is thereby limited. The pedestrian protection airbag 32 is suppressed from being pulled in by the inflators 34 as a result. The present exemplary embodiment thereby enables stable deployment behavior of the pedestrian protection airbag 32 as a result.

Moreover, in the present exemplary embodiment, the stopper 100 is integrally formed to a rear end section side of the hood inner panel 22 and is configured by the vertical wall (rear end wall 102A) of the protruded portion 102 that protrudes toward the vehicle lower side, and so there is no increase in the number of components. The present exemplary embodiment thereby enables an increase in costs due to an increase in the number of assembly steps to be eliminated as a result.

Sixth Exemplary Embodiment

Figure 11A:
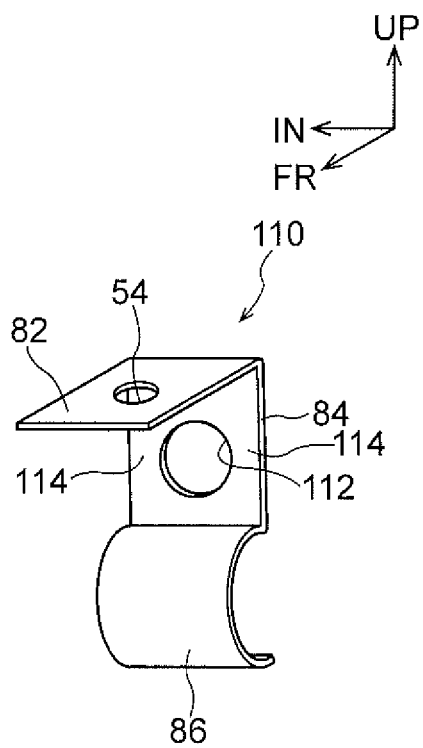
FIG. 11A is an enlarged perspective view illustrating an inflator attachment bracket, this being a relevant portion of an automobile pedestrian protection airbag device according to a sixth exemplary embodiment.
Figure 11B:
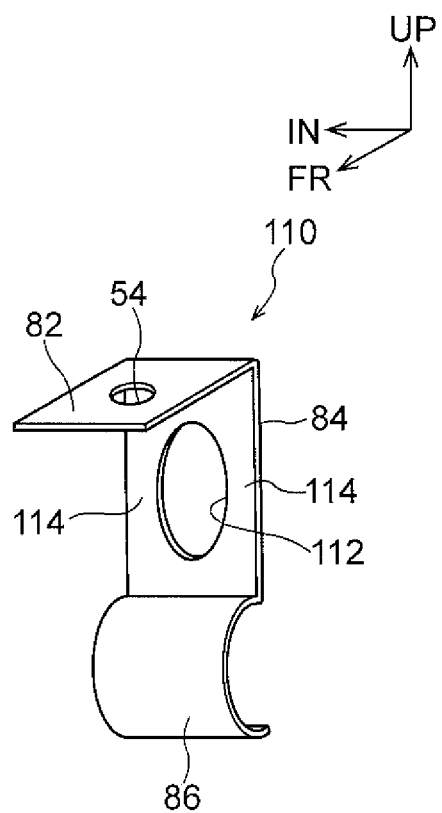
FIG. 11B is an enlarged perspective view illustrating a state in which the inflator attachment bracket illustrated in FIG. 11A has deformed due to deployment reaction force of a pedestrian protection airbag.

Explanation follows regarding a sixth exemplary embodiment of a vehicular pedestrian protection airbag device according to the present invention, with reference to FIG. 11A and FIG. 11B. Note that configuration portions similar to in the first exemplary embodiment and so on described above are allocated the same reference numerals, and explanation thereof is omitted.

As illustrated in FIG. 11A, in the sixth exemplary embodiment, an inflator attachment bracket 110 has a distinctive configuration. Specifically, the inflator attachment bracket 110 includes a first fixing portion 82, an intermediate portion 84, and a second fixing portion 86, similarly to the inflator attachment bracket 80 of the second exemplary embodiment. However, the intermediate portion 84 is not formed with the excess length portion 88, and a circular hole 112 is formed as a weakened portion at a central portion of the intermediate portion 84. Peripheral portions 114, serving as stretching portions and deformation portions positioned to the left and right (on both vehicle width direction sides) of the circular hole 112 in the intermediate portion 84 are thereby configured with lower rigidity than other locations of the intermediate portion 84 (a location further to the vehicle upper side than an upper edge of the circular hole 112 and a location further to the vehicle lower side than a lower edge of the circular hole 112).

Operation and Advantageous Effects

In the above configuration, the inflator attachment bracket 110 is configured from a plate member, and the plate member (the intermediate portion 84) is formed with the circular hole 112 such that the peripheral portions 114 of the circular hole 112 configure stretching portions. Accordingly, as illustrated in FIG. 11B, a portion of the deployment reaction force of the pedestrian protection airbag 32 can be absorbed by stretching of the left and right peripheral portions 114. This thereby enables a reduction in the deployment reaction force of the pedestrian protection airbag 32 input to the rear end section side of the hood 14. Moreover, there is no increase in the number of components, and no increase in the size of the inflator attachment bracket 110. The present exemplary embodiment thereby enables the deployment reaction force of the pedestrian protection airbag 32 input to the rear end section of the hood 14 to be suppressed without an increase in weight or costs, and moreover does not cause an increase in the installation space required by the inflator attachment bracket 110.

Note that in the configuration described above, the circular hole 112 is formed to the intermediate portion 84. However, the weakened portion is not limited thereto, and may be configured by an elongated hole, configuration may be made in which notches are formed to both sides of the intermediate portion, or circular arc shapes may be cut out of both sides to configure a narrow width at an up-down direction intermediate portion of the intermediate portion. Moreover, a thinned portion may be formed in the intermediate portion to configure a weakened portion.

Seventh Exemplary Embodiment

Explanation follows regarding a seventh exemplary embodiment of a vehicular pedestrian protection airbag device according to the present invention, with reference to FIG. 12A to FIG. 14. Note that configuration portions similar to in the first exemplary embodiment and so on described above are allocated the same reference numerals, and explanation thereof is omitted.

Figure 12A:
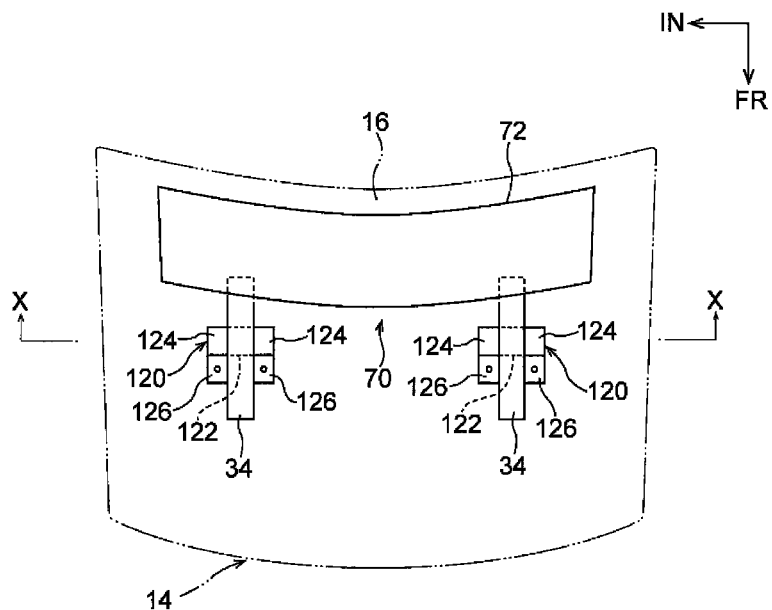
FIG. 12A is a plan view illustrating placement of inflators of an automobile pedestrian protection airbag device according to a seventh exemplary embodiment.
Figure 12B:
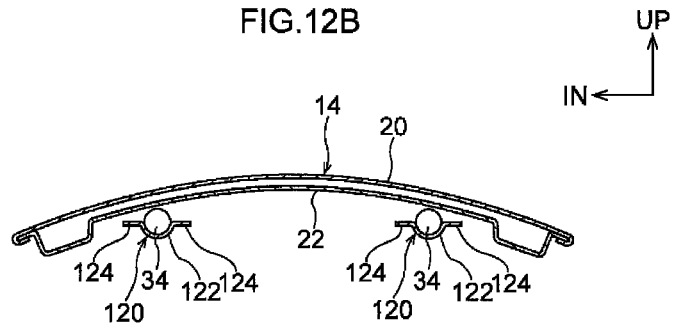
FIG. 12B is a vertical cross-section of a hood, taken along line X-X in FIG. 12A.

As illustrated in FIG. 12A and FIG. 12B, in the seventh exemplary embodiment, the pair of left and right of inflators 34 are of a lengthwise installation type. Namely, the respective inflators 34 are installed with their axial directions running in the vehicle front-rear direction.

Figure 13:
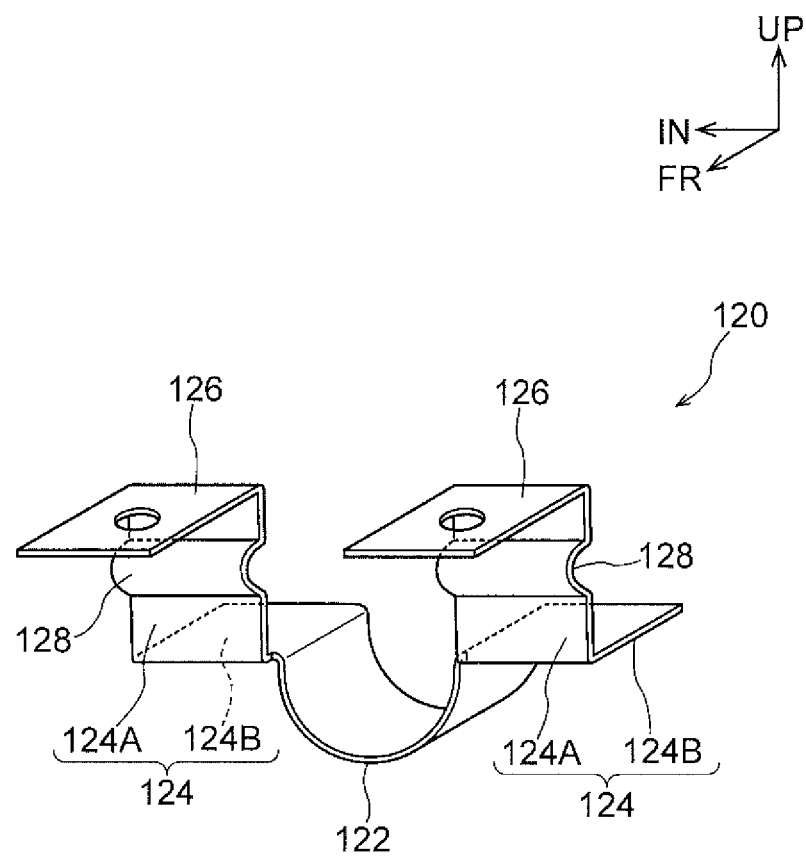
FIG. 13 is an enlarged perspective view illustrating an inflator attachment bracket employed in the seventh exemplary embodiment.

The inflators 34 are attached to the hood inner panel 22 employing inflator attachment brackets 120 as illustrated in FIG. 13, corresponding to the lengthwise installation of the inflators 34. Specifically, the inflator attachment brackets 120 each include a second fixing portion 122 disposed at a central portion and formed in a semicircular arc shape opening toward the vehicle upper side, and a pair of left and right first fixing portions 126 provided across intermediate portions 124 on both sides of the second fixing portion 122. The first fixing portions 126 are formed in rectangular flat plate shapes. The intermediate portions 124 are formed in L-shapes as viewed from the side, and are each configured by a vertical wall portion 124A facing toward the vehicle front side, and a horizontal wall portion 124B facing toward the vehicle lower side. An excess length portion 128 serving as a deformation portion formed in a semicircular tube shape is integrally formed across the entire width of a vehicle up-down direction intermediate portion of each vertical wall portion 124A. Opposing sides of the horizontal wall portions 124B are connected to left and right upper ends of the second fixing portion 122.

Operation and Advantageous Effects

Figure 14A:
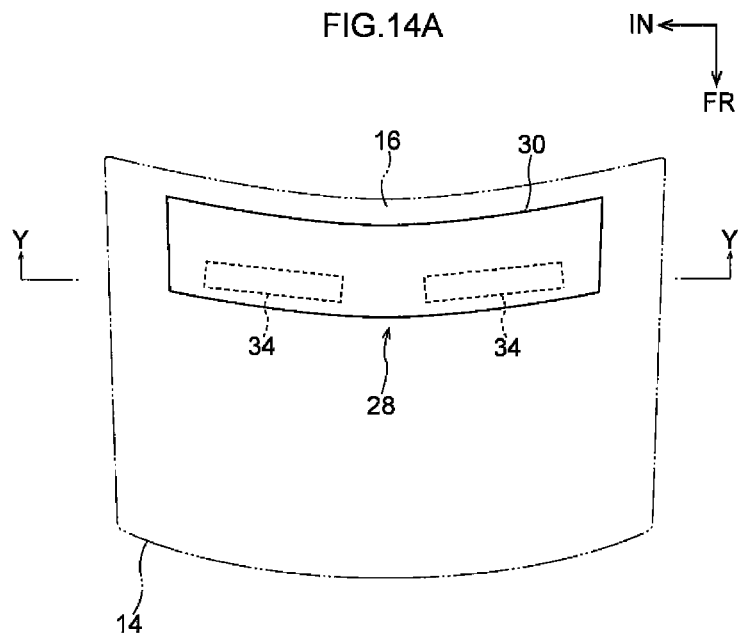
FIG. 14A is a plan view illustrating placement of inflators of an automobile pedestrian protection airbag device according to a comparative example.
Figure 14B:
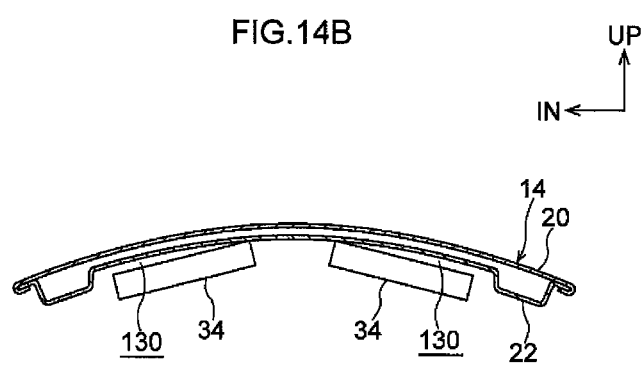
FIG. 14B is a vertical cross-section of a hood, taken along line Y-Y in FIG. 14A.

The configuration described above obtains the following operation and advantageous effects. As illustrated in FIG. 14A and FIG. 14B, when a hood 14 is cut away along the vehicle width direction, in general, the cross-section profile of the hood 14 forms a protruding curved shape with a central section protruding out further toward the vehicle upper side than sections at both ends. Accordingly, if the inflators 34 that have straight column shapes were installed with their length directions along the vehicle width direction, dead spaces 130 would be formed between the inflators 34 and the hood inner panel 22.

However, in the present exemplary embodiment, as illustrated in FIG. 12A and FIG. 12B, the inflators 34 are disposed with their length directions along the vehicle front-rear direction, and the respective inflator attachment brackets 120 have a corresponding structure in which the first fixing portions 126 are disposed on both sides of the second fixing portion 122, thereby reducing the dead spaces 130 described above. Moreover, since the respective excess length portions 128 are formed as deformation portions between the first fixing portions 126 and the second fixing portions 122, the burden on the respective excess length portions 128 is reduced by half. This thereby enables the length of each excess length portion 128 to be reduced by half for the same deployment reaction force, or enables twice the deployment reaction force to be accommodated if the length of the excess length portions 128 is not reduced by half. The present exemplary embodiment thereby enables improved space efficiency inside the hood 14, and enables a larger deployment reaction force to be accommodated as a result.

Supplementary Explanation to the Above Exemplary Embodiments

Note that in the exemplary embodiments described above, the inflators 34 are formed in straight circular column shapes. However, there is no limitation thereto, and it is sufficient that the inflators 34 have straight column shapes, such as straight rectangular column shapes.

The invention claimed is:

1. A vehicular pedestrian protection airbag device comprising:

an inflator that is installed at a lower side of a rear end section of a hood capable of being raised toward a vehicle upper side at the rear end section, and that ejects gas on actuation;

a pedestrian protection airbag that is stowed in a folded state at the lower side of the rear end section of the hood, and that inflates and deploys from between the rear end section of the hood and a windshield glass toward a vehicle upper face side and a vehicle rear side by being supplied with gas from the inflator; and an inflator attachment bracket configured including a first fixing portion fixed to a lower face side of the rear end section of the hood, a second fixing portion to which the inflator is fixed, and a deformation portion that is provided between the first fixing portion and the second fixing portion and that plastically deforms by stretching or compressing so as to permit movement of the inflator toward an opposite direction from an inflation and deployment direction of the pedestrian protection airbag.

2. The vehicular pedestrian protection airbag device of claim 1, wherein:
the inflator attachment bracket is configured by a plate member;
the deformation portion is configured by an excess length portion formed in the plate member; and
as viewed from a side of the hood, the excess length portion is formed in any shape selected from the group consisting of a hill shape, a wave shape, a W-shape, a V-shape, a sideways S-shape, an M-shape, an N-shape, and a circular arc shape.

3. The vehicular pedestrian protection airbag device of claim 1, wherein:
the inflator attachment bracket is configured from a plate member; and
the deformation portion is configured as a stretching portion provided at a periphery of a weakened portion at the plate member.

4. The vehicular pedestrian protection airbag device of claim 1, further comprising:
a module case that internally houses the pedestrian protection airbag; and
an inflator case that is attached to a front wall portion of the module case through a sealing member, and that is capable of detaching from the module case under input of contact load from the inflator.

5. The vehicular pedestrian protection airbag device of claim 1, further comprising a module case that internally houses the inflator and the pedestrian protection airbag, wherein
a planned rupture portion that ruptures under input of contact load from the inflator is set in the module case at a location facing the inflator.

6. The vehicular pedestrian protection airbag device of claim 1, wherein:
the inflator is formed in a straight column shape and is disposed with a length direction along a vehicle front-rear direction; and
the inflator attachment bracket has the second fixing portion disposed at a central portion and the first fixing portion respectively provided at both sides of the second fixing portion, and has the deformation portion respectively provided between each of the first fixing portions and the second fixing portion.

7. The vehicular pedestrian protection airbag device of claim 1, further comprising a stopper that is provided on a movement direction side of the inflator, and that limits a movement amount of the inflator by impeding the inflator attachment bracket or the inflator.

8. The vehicular pedestrian protection airbag device of claim 7, wherein the stopper is configured by a separate component fixed to a hood inner panel configuring an inner side member of the hood.

9. The vehicular pedestrian protection airbag device of claim 7, wherein the stopper is configured by a vertical wall of a protruded portion, the protruded portion being integrally formed with a rear end section side of a hood inner panel configuring an inner side member of the hood and protruding toward the vehicle lower side.

10. The vehicular pedestrian protection airbag device of claim 1, wherein:
a protruded portion is formed at a vehicle rear side of a hood inner panel so as to protrude out toward the vehicle lower side and extend along a vehicle width direction, the protruded portion being provided at a position offset further toward a vehicle front side than the rear end section of the hood; and
the inflator and the pedestrian protection airbag are disposed in a storage space formed at a hood inner panel at the vehicle rear side of the protruded portion.

11. The vehicular pedestrian protection airbag device of claim 10, wherein the inflator is attached to a bottom wall of the protruded portion of the hood inner panel by employing the inflator attachment bracket.

12. The vehicular pedestrian protection airbag device of claim 11, wherein the inflator attachment bracket is manufactured by pressing a belt-shaped metal plate member that is long and thin in a vehicle front-rear direction.

13. The vehicular pedestrian protection airbag device of claim 11, wherein the second fixing portion is formed in a semicircular shape bulging toward the vehicle lower side, and the inflator is fixed to an upper face of the second fixing portion.

14. The vehicular pedestrian protection airbag device of either claim 11, further comprising
a module case that is formed in an elongated substantially box shape with a length direction in the vehicle width direction, that stows the inflator and the pedestrian airbag, and that includes an upper side attachment wall and a lower side attachment wall, wherein
the first fixing portion of the inflator attachment bracket is fastened to the bottom wall of the protruded portion of the hood inner panel together with the upper side attachment wall and the lower side attachment wall in a state of being clamped between the upper side attachment wall and the lower side attachment wall.

15. The vehicular pedestrian protection airbag device of claim 14, wherein:
the module case further includes a front wall portion provided upright along a rear end wall of the protruded portion; and
an excess length portion includes a first inclined portion facing a front wall portion along a vehicle front-rear direction, a second inclined portion facing the inflator along the vehicle front-rear direction, and an apex portion connecting the first inclined portion and the second inclined portion together.

16. The vehicular pedestrian protection airbag device of either claim 14, wherein the second fixing portion is disposed at a position separated from a front wall portion of the module case by a specific distance toward the vehicle rear side.

* * * * *